US008611751B2

(12) United States Patent
Liu et al.

(10) Patent No.: US 8,611,751 B2
(45) Date of Patent: Dec. 17, 2013

(54) SYSTEM, APPARATUS AND METHOD FOR COMMUNICATING DATA VIA POLARIZATION MULTIPLEXING

(75) Inventors: Xiang Liu, Marlboro, NJ (US); Chandrasekhar Sethumadhavan, Old Bridge, NJ (US)

(73) Assignee: Alcatel Lucent, Paris (FR)

( * ) Notice: Subject to any disclaimer, the term of this patent is extended or adjusted under 35 U.S.C. 154(b) by 619 days.

(21) Appl. No.: 12/712,247

(22) Filed: Feb. 25, 2010

(65) Prior Publication Data

US 2010/0215374 A1 Aug. 26, 2010

Related U.S. Application Data

(60) Provisional application No. 61/208,756, filed on Feb. 26, 2009.

(51) Int. Cl.
*H04J 14/08* (2006.01)
*H04B 10/04* (2011.01)
*H04B 10/00* (2013.01)

(52) U.S. Cl.
USPC ............. 398/98; 398/65; 398/43; 398/184; 398/188; 398/198; 398/201

(58) Field of Classification Search
USPC .................................................. 398/43, 65
See application file for complete search history.

(56) References Cited

U.S. PATENT DOCUMENTS 7,623,796 B2  11/2009  Liu
7,643,760 B1  1/2010  Han et al.
2002/0186435 A1  12/2002  Shpantzer et al.
2003/0020985 A1*  1/2003  LaGasse et al. ............. 359/135
2003/0147646 A1*  8/2003  Zitelli ............................ 398/65
2004/0114939 A1  6/2004  Taylor
2005/0185968 A1  8/2005  Dorrer et al.
2005/0191061 A1*  9/2005  Liu et al. ...................... 398/188
2005/0196176 A1  9/2005  Sun et al.
2006/0013597 A1  1/2006  Crivelli et al.
2006/0171720 A1*  8/2006  Agarwal et al. .............. 398/186
2007/0009269 A1  1/2007  Zitelli
2007/0201879 A1*  8/2007  Liu .............................. 398/188
2009/0086215 A1  4/2009  Liu et al.
2009/0196602 A1*  8/2009  Saunders et al. .............. 398/26
2010/0196016 A1*  8/2010  Zhang et al. .................. 398/152

OTHER PUBLICATIONS

Fludger ["10×111 Gbits/s, 50GHz spaced PLOMUX-RZ-DQPSK transmission over 2375 km employing coherent equalization" Optical Society of America 2007].*
Liu II ["Digital Self Coherent Detection" OPTICS EXPRESS vol. 16, No. 2, Jan. 9, 2008].*
Liu ["Direct Detection of 107-Gb/s Polarization-Multiplexed DQPSK with Electronic Polarization Demultiplexing" OFC/NFOEC Conference Paper Feb. 24, 2008].*
Liu-date.*

(Continued)

*Primary Examiner* — Shi K Li
*Assistant Examiner* — Oommen Jacob
(74) *Attorney, Agent, or Firm* — Wall & Tong, LLP (57) ABSTRACT

Systems, apparatus and method for modulating digital data onto an optical carrier to produce a modulated optical carrier in which symbol-modulated optical signals of orthogonal polarizations are temporally interleaved and adapted to be processed by electronic time-division demultiplexing to recover the digital data modulated onto the orthogonal polarizations of the optical signals.

15 Claims, 6 Drawing Sheets

(56) References Cited

OTHER PUBLICATIONS

Ezra Ip, et al., "Coherent Detection in Optical Fiber Systems," Optics Express, vol. 16, No. 2, Jan. 21, 2008, pp. 753-792.

C. Laperle et al., Wavelength Division Multiplexing (WDM) and Polarization Mode Dispersion (PMD) Performance of a Coherent 40Gbit/s Dual-Polarization Quadrature Phase Shift Keying (DP-QPSK) Transceiver, Optical Society of America 2007, Post-Deadline Paper (PDP) 16.

G. Charlet et al., "Efficient Mitigation of Fiber Impairments in an Ultra-Long Haul Transmission of 40Gbit/s Polarization-Multiplexed Data, by Digital Processing in a Coherent Rreceiver," Optical Society of America 2007, Post-Deadline Paper (PDP) 17.

A. H. Gnauck et al., "25.6-Tb/s C+L-Band Transmission of Polarization-Multiplexed RZ-DQPSK Signals," Optical Society of America 2007, Post-Deadline Paper (PDP) 19.

C. R. S. Fludger et al., "10×111 Gbit/s, 50 HGz spaced, POLMUX-RZ-DQPSK Transmission over 2375 km Employing Coherent Equalisation," Optical Society of America 2007, Post-Deadline Paper (PDP) 22.

M. Kato, et al., "Transmitter PIC for 10-Channel × 40Gb/s per Channel Polarization-Multiplexed RZ-DQPSK Modulation," in *Optical Fiber Communication Conference*, OSA Technical Digest (CD) (Optical Society of America, 2009), paper OThN2.

X. Liu, et al., "Direct Detection of 107-Gb/s Polarization-Multiplexed DQPSK with Electronic Polarization Demultiplexing," in *Optical Fiber Communication Conference and Exposition and The National Fiber Optic Engineers Conference*, OSA Technical Digest (CD) (Optical Society of America, 2008), paper OTuG4, pp. 1-3.

X Liu, et al., "Digital self-coherent detection," Optics Express, vol. 16, No. 2, pp. 792-803.

Liu at al: 'DSP-Enabled Compensation of Demodulator Phase Error and Sensitivity Improvement in Direct-Detection 40-Gb/s DQPSK, ECOC 2006, Sep. 24-28, 2006, paper Th4.4.5, p. 1-2.

Van den Borne at al: "Coherent Equalization versus Direct Detection for 111-Gb/s Ethernet Transport," LEOS Summer topical meeting 2007, Jul. 23-25, 2007, paper MA2.4, pp. 11-12.

\* cited by examiner

SYSTEM, APPARATUS AND METHOD FOR COMMUNICATING DATA VIA POLARIZATION MULTIPLEXING

CROSS REFERENCE TO RELATED APPLICATION

This application claims the benefit of provisional patent application Ser. No. 61/208,756, filed Feb. 26, 2009, which is incorporated herein by reference in its entirety.

FIELD OF THE INVENTION

The inventions relate generally to methods, systems and apparatus for communicating data optically.
Discussion
This section introduces aspects that may help facilitate a better understanding of the inventions. Accordingly, the statements of this section are to be read in this light and are not to be understood as admissions about what is prior art or what is not prior art.

Optical communications systems can communicate data at high data rates. Various transmission schemes have been proposed for increasing data rates in optical communication systems.

BRIEF SUMMARY

Various deficiencies of the prior art are addressed by the present invention of apparatus, methods and systems providing high speed optical communication, such as systems, apparatus and method for modulating digital data onto an optical carrier to produce a modulated optical carrier in which symbol-modulated optical signals of orthogonal polarizations are temporally interleaved and adapted to be processed by electronic time-division demultiplexing to recover the digital data therefrom. In various embodiments, the optical signals are return-to-zero optical pulses. In various embodiments, the optical signals have duty cycles of 50% or less. In various embodiments, the digital data is modulated according to a phase shift keying format. In various embodiments, further digital data is modulated onto the optical carrier according to phase modulation.

BRIEF DESCRIPTION OF THE DRAWINGS

The teachings of the present invention can be readily understood by considering the following detailed description in conjunction with the accompanying drawings, in which.

While the Figures and the Detailed Description of Illustrative Embodiments describe some embodiments, the inventions may have other forms and are not limited to those described in the Figures and the Detailed Description of Illustrative Embodiments.

To facilitate understanding, identical reference numerals have been used, where possible, to designate identical elements that are common to the figures.

DETAILED DESCRIPTION OF ILLUSTRATIVE EMBODIMENTS

The illustrative embodiments will be primarily described within the context of, illustratively, a polarization-interleaved (PI) multilevel PSK modulated optical signal, such as a DQPSK or 8-ary DQPSK signal to achieve high bit rate (e.g., 100 Gb/s) per wavelength channel, and high spectral efficiency, and to receive the signal by orthogonal differential direct detection. Those skilled in the art and informed by the teachings herein will realize that the invention is also applicable to various other embodiments. For example, various embodiments further utilize electronic polarization de-interleaving to automatically separate independent data contents carried by two polarization states of the optical signal. In one embodiment, the receiver components include an orthogonal delay interferometer having one input, four outputs and two balanced detectors. In a "soft-detection" embodiment, two analog to digital converters (ADCs) are used by the receiver. The output carrier signal including polarization—interleaved (PI) single-level ON-OFF keyed of multi-level PSK modulated optical signal is adapted to be polarization demultiplexed by electronic signal processing means such as a digital signal processing (DSP) and related structure as disclosed below.

Figure 1:
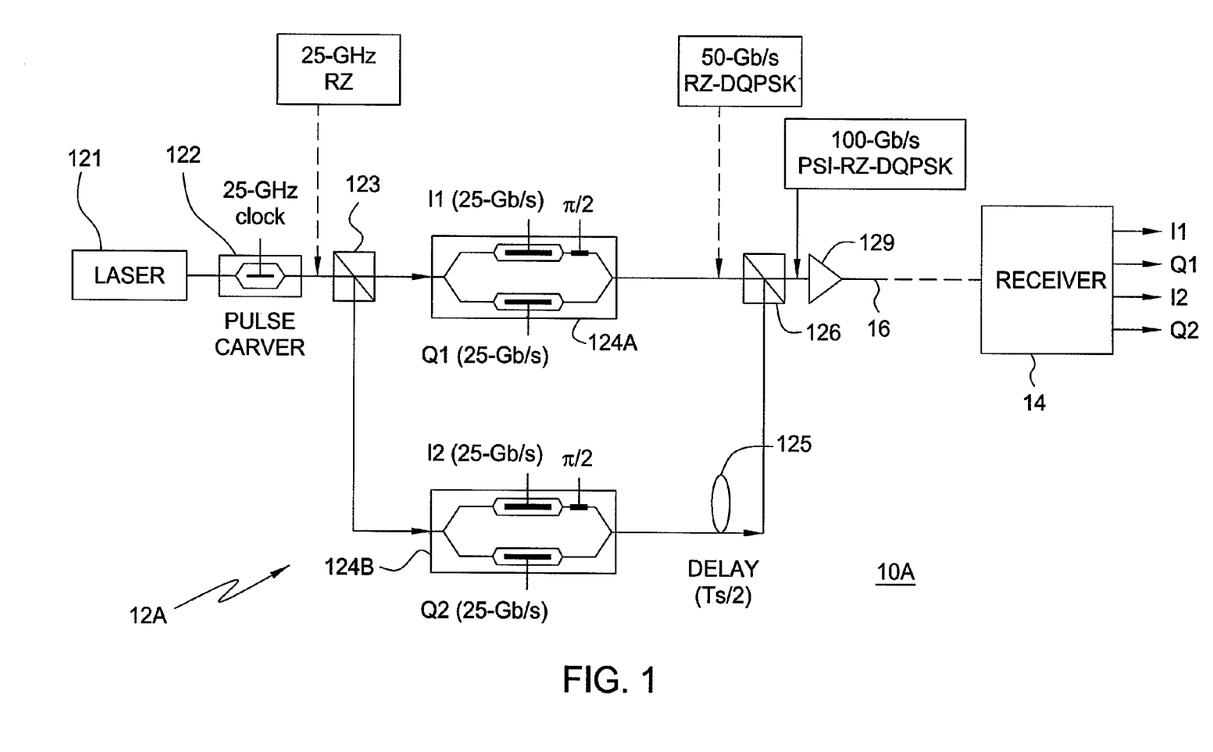
FIGS. 1 and 2 depict block diagrams of optical communications systems according to various embodiments.
Figure 2:
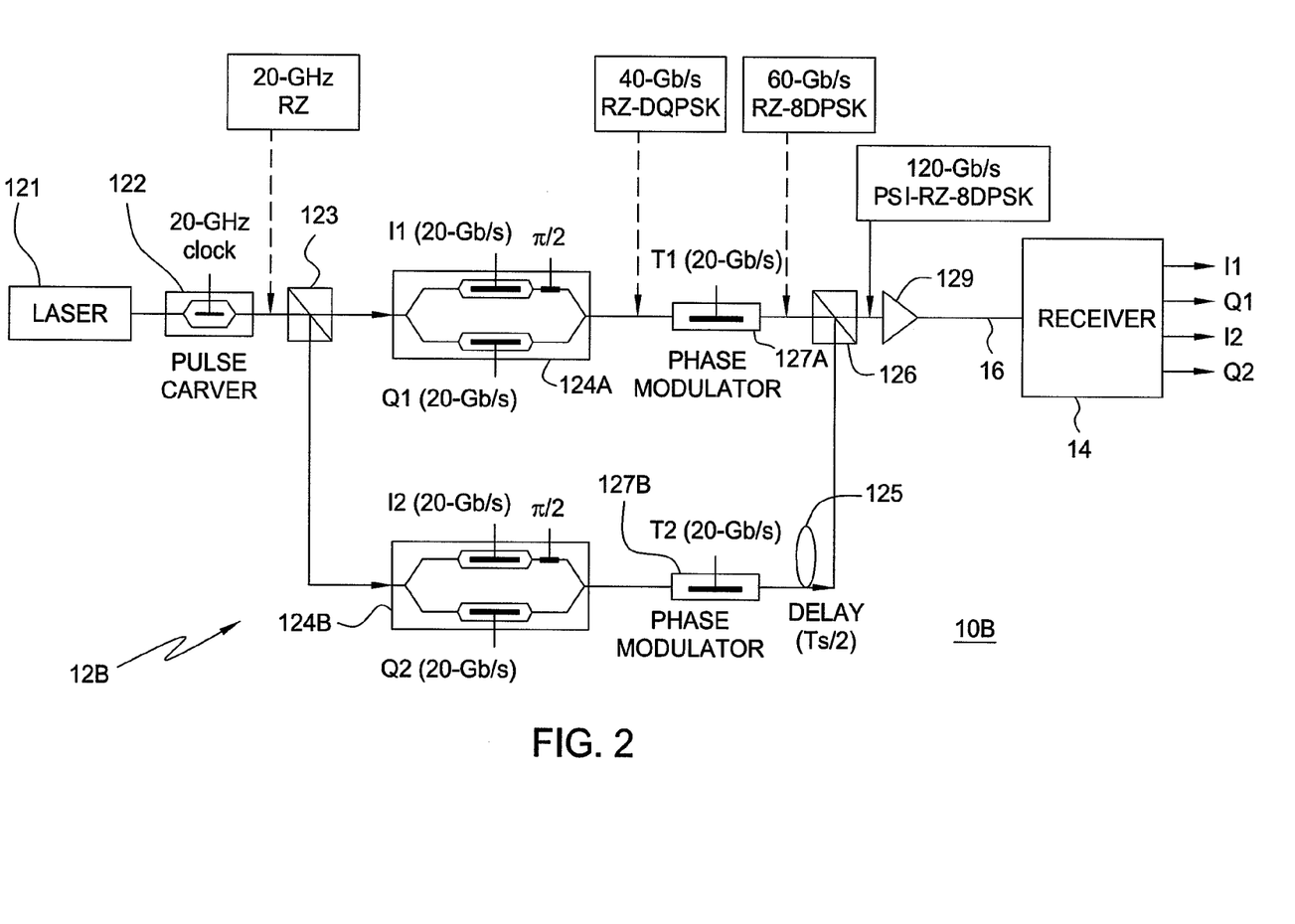

FIGS. 1 and 2 depict block diagrams of optical communications systems according to various embodiments. Specifically, referring to FIGS. 1 and 2, optical data communication systems 10A and 10B include an optical data transmitter 12A, 12B; an optical data receiver 14A, 14B; and an all-optical fiber transmission link 16 optically connecting the optical data transmitter 12A, 12B to the optical data receiver 14A, 14B.

Each optical data transmitter 12A, 12B includes a laser 121 that provides an optical carrier and a pulse carver 122 that produces a sequence or stream of optical pulses on the optical carrier provided by the laser 121, e.g., a stream of return-to-zero (RZ).

Each optical data transmitter 12A, 12B includes a polarization beam splitter (PBS) 123 that splits the stream of received RZ pulses provided by the pulse carver 122 according to orthogonal polarization to produce first and second orthogonal polarization component streams. The PBS 123 provides the first orthogonal polarization component stream to an input of a first electro-optical modulator 124A, e.g., a Mach-Zehnder interferometer (MZI-1), and provides the second orthogonal polarization component stream to an input of a second second electro-optical modulator 124B, e.g., a second Mach-Zehnder interferometer (MZI-2) 124B.

Each electro-optical modulator 124A, 124B is configured to modulate a stream of digital data onto stream of corresponding optical pulses received therein. In the illustrated embodiments, each electro-optical modulators 124A, 124B has one internal optical branch that modulates a stream of data bits onto the in-phase component (i.e., I1, I2) of the received stream of RZ optical pulses and has a second internal optical branch that modulates a separate stream of data bits onto the quadrature phase component (i.e., QI, Q2) of the received optical pulses. In each optical modulator 124A, 124B, the modulated optical pulses of the two internal optical branches are relatively delayed by a relative phase, e.g., about $\pi/4$, and recombined to produce an output stream of modulated optical pulses of one polarization. In such embodiments, each orthogonal polarization component of the received stream of optical data pulses is modulated to carry an independent digital data stream in a quadrature PSK (QPSK) modulation format. In some such embodiments, the optical modulation format may be a differential QPSK (DQPSK) format as illustrated. In other embodiments, each optical modulator 124A, 124B may modulate data onto the received polarization component according to another format, e.g., another QPSK format, and/or a QAM format.

In each optical data transmitter 12A, 12B, the data modulated orthogonal polarization components provided by the two optical modulators 124A, 124B are also recombined via a polarization beam combiner (PBC) 126 to produce an output optical carrier in which the two orthogonal polarization components carry independent streams of digital data. The modulated output optical carrier may also be optionally amplified via an optical amplifier 129 prior to transmission. The output optical carrier is transmitted to the all-optical fiber link 16, which conveys the signal toward an optical data receiver 14.

In each optical data transmitter 12A, 12B, one orthogonal polarization component is delayed by about ½ of the pulse period using a delay line or delay element 125. In this manner, the optical pulses of orthogonal polarizations are temporally interleaved in the output optical carrier, i.e., during alternating periods of the modulation produced by the pulse carver 122. This may be achieved by configuring the pulse carver 122 to produce RZ pulses having a 50% or smaller duty cycle. Thus, the two data streams on the two orthogonal components are temporally interleaved in the output optical carrier.

In the optical data transmitter 12B of FIG. 2, each data modulated pulse stream from one of the electro-optical modulators 124A, 124B is further modulated by a respective phase modulator 127A, 127B to carry a further independent digital data stream (T1, T2) thereon or to modify the form of the signal point constellation carrying the data stream. For example, such further modulation may increase the data rate of said modulated polarization component.

Referring to the embodiment of FIG. 1, the pulse carver 122 is depicted, e.g., as processing the output of laser 121 according to a 25 GHz clock signal to provide a corresponding 25 GHz sequence or stream of return-to-zero (RZ) optical pulses on the optical carrier provided by the laser 121. Each of the electro-optical modulators 124A, 124B is depicted, e.g., as receiving a respective orthogonal polarization component of the 25 GHz sequence or stream of return-to-zero (RZ) optical pulses. Each of the electro-optical modulators 124A, 124B is depicted, e.g., as modulating onto its received stream of RZ pulses a 25 Gb/s in-phase data signal I and a 25 Gb/s quadrature-phase data signal Q to produce, illustratively, a 50 Gb/s QPSK or DQPSK modulated data signal.

The delay element 125 is depicted as relatively delaying the output of the second optical modulator 124B, though in other embodiments (not shown) a delay element may be used to instead relatively delay the output of the first electro-optical modulator 124A. After being combined by the PBC 126, the resulting output optical carrier comprises, illustratively, a 100 Gb/s polarization interleaved QPSK or DQPSK modulated data signal.

Referring to the embodiment of FIG. 2, the pulse carver 122 may, e.g., process the output of laser 121 according to a 20 GHz clock signal to provide a corresponding 20 GHz sequence or stream of return-to-zero (RZ) optical pulses. Each of the electro-optical modulators 124A, 124B may then, receive a respective orthogonal polarization component of the 20 GHz sequence or stream of return-to-zero (RZ) optical pulses. Each of the electro-optical modulators 124A, 124B may, e.g., then, modulate onto its received stream of RZ pulses a 20 Gb/s in-phase data signal I and a 20 Gb/s quadrature-phase data signal Q to produce, illustratively, a 40 Gb/s QPSK or DQPSK modulated data signal.

Each of the phase modulators 127A, 127B phase modulates the signal provided by the corresponding electro-optical modulator 124A, 124B according to a respective 20 Gb/s data stream T1, T2 to produce respective 60 Gb/s 8-PSK or D8PSK modulated data signals.

The delay element 125 is depicted as relatively delaying the output of the second phase modulator 127B, though in other embodiments (not shown) a delay element may be used to relatively delay the output of the first phase modulator 127A. After being combined by the PBC 126, the resulting output optical carrier comprises, illustratively, a 120 Gb/s polarization interleaved 8PSK or D8PSK modulated data signal.

The optical receiver 14 may be implemented using any of the optical data receivers discussed herein and/or those discussed in U.S. patent application Ser. No. 11/865,035, filed Sep. 30, 2007 and entitled "Polarization-Multiplexed Multilevel Differential Phase Shift Keyed Signal Detector," which is herein incorporated by reference in its entirety. Exemplary optical receivers 14 will be discussed in more detail below with respect to FIGS. 3-5. Specifically, various optical transmitters, optical receivers, and methods of operating optical transmitters and/or receivers described in U.S. patent application Ser. No. 11/865,035 may be useful in some embodiments of optical communications systems, transmitters, receivers, and methods of operating said optical communications systems, transmitters and/or receivers, respectively, in this application.

Often, the pulse carver provides a stream of RZ pulses from an optical carrier provided by a laser or other source of coherent light in response to a clock signal of frequency f, e.g., a 20 GHz to 30 Ghz, thereby producing the stream of RZ pulses at the same frequency f or a multiple thereof. Each electro-optical modulator 124A, 124B may operate, e.g., at a bitrate corresponding to the frequency f to produce a bitstream modulated bitstream of twice the corresponding bitrate. It will be appreciated that frequencies/bitrates higher or lower the frequencies/bitrates discussed herein may be used in various embodiments. In various embodiments, the frequency f may be selected anywhere within the range of 1 GHz to 100 GHz.

Referring in particular to the embodiment of FIG. 2, the phase modulators 127A, 127B may, e.g., operate at a bitrate corresponding to the frequency f. It will be appreciated that frequencies/bitrates higher or lower the frequencies/bitrates discussed herein may be used in various embodiments.

Figure 5:
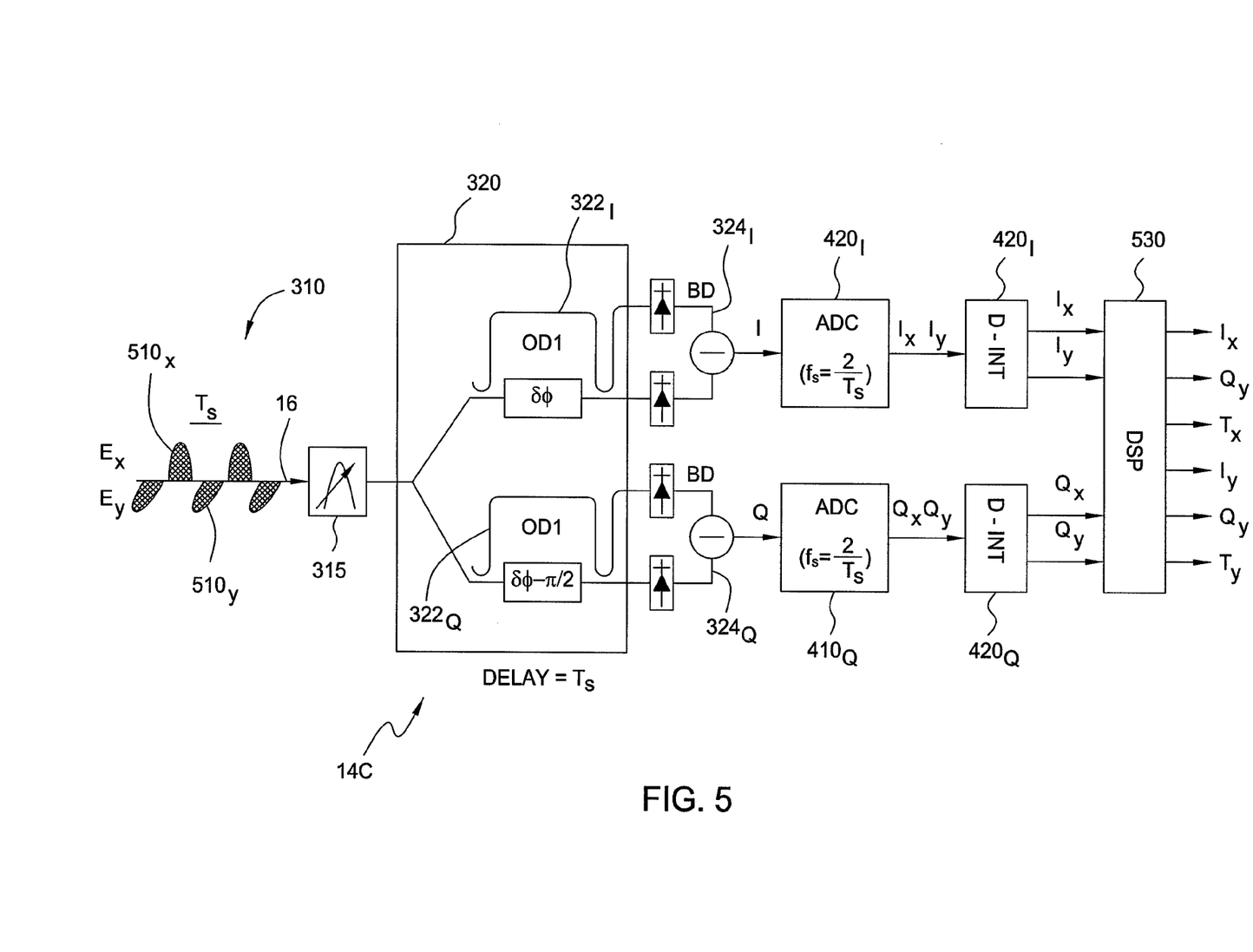
Figure 6:
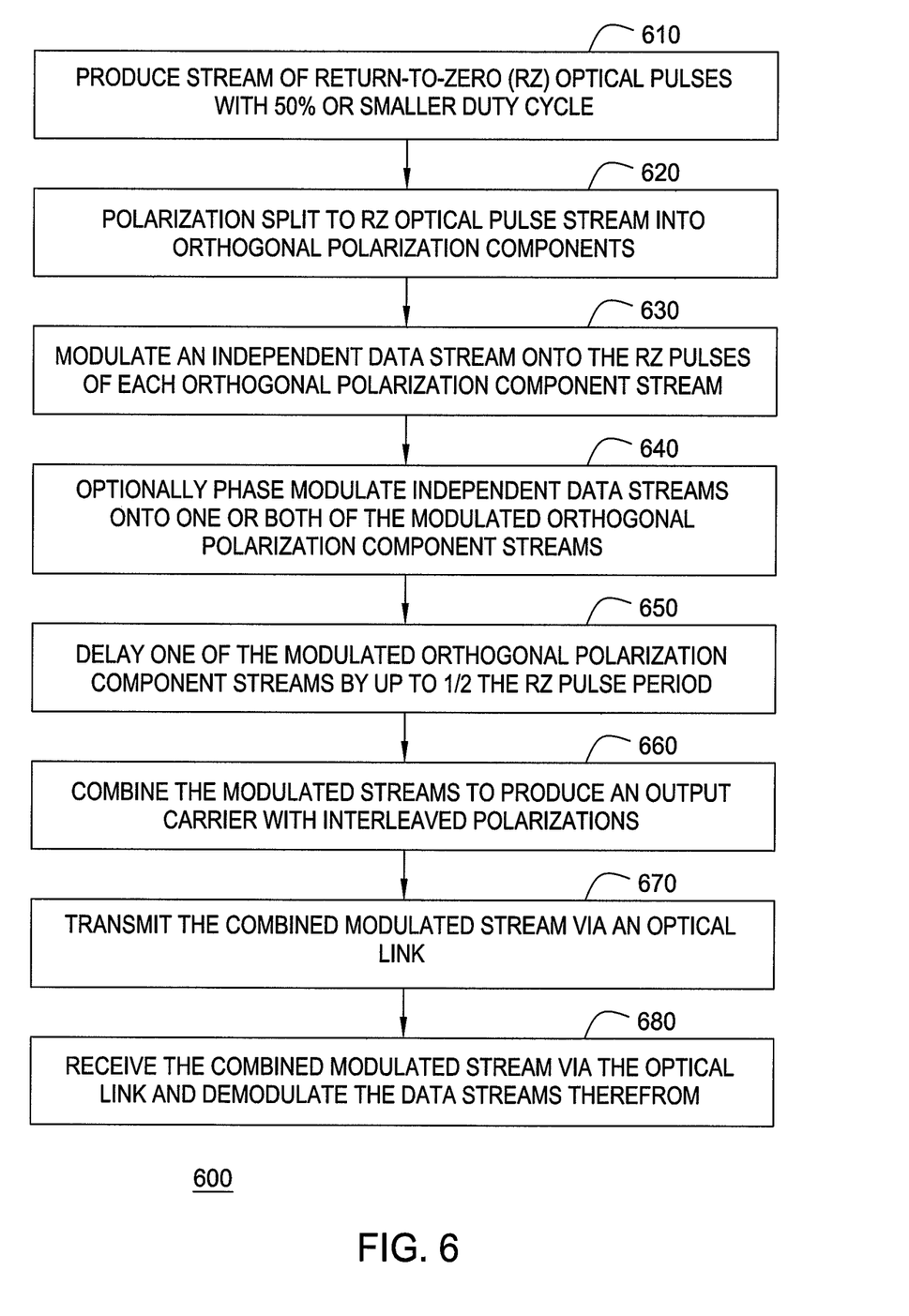
FIG. 6 depicts a flow diagram of a method according to one embodiment.

FIG. 6 depicts a flow diagram of a method according to one embodiment. Specifically, FIG. 6 depicts a method of optically communicating digital data via polarization multiplexing, e.g., with apparatus illustrated in FIGS. 1-5.

At step 610, a stream of return-to-zero (RZ) optical pulses with 50% or smaller duty cycle is produced by, illustratively, a pulse carver that produces the stream of RZ optical pulses from an optical carrier provided by a laser.

At step 620, the stream of RZ optical pulses is split into orthogonal polarization components using, illustratively, a polarization beam splitter (PBS).

At step 630, an independent data stream is modulated onto the RZ pulses of each orthogonal polarization component. Each data stream may be illustratively, modulated according to a QPSK format or a DQPSK format. Other modulation techniques and formats may also be used, e.g., a larger constellation PSK or DPSK format or a QAM format.

At optional step 640, a separate and/or independent data stream may optionally be phase modulated onto the modulated RZ pulses of each orthogonal polarization component.

At step 650, one of the modulated orthogonal polarization component streams is delayed by about ½ the RZ pulse period or less. If optional step 640 is used, then the delay may be imparted to the one of the modulated orthogonal polarization component streams after the stream has been subjected to the phase modulation of step 640.

At step 660, the modulated streams are combined to produce an output carrier signal in which the polarizations of optical pulses are interleaved using, illustratively, a polarization beam combiner (PBC).

At step 670, the modulated optical carrier signal including the combined modulated streams is transmitted via an all-optical link to one or more receivers.

At step 680, the carrier signal including the combined modulated streams is received from the optical link via the one or more receivers. The two separate and/or independent data streams modulated upon the carrier signal are demodulated therefrom.

A modulated optical carrier signal received via an optical fiber or other all-optical transport means is processed by a an receiver/detector comprising an optical filter (OF), an optical splitter (OS), two pairs photo-diodes (PO), two analog-to-digital converters (ADCs) or differential amplifiers (DFFs), and digital circuitry for demodulating data from the polarization components received via the optical carrier signal received stream of electronic digital data signals from the associated ADC. Each pair of photo-diodes is connected in a differential configuration to extract data from the received optical carrier via a differential configuration. The digital circuitry includes a digital signal processor (DSP) that digitally demodulates the data from the stream of digital data symbols received from the corresponding ADC.

The above described embodiments provide methods, apparatus, systems for communicating digital data via a stream of polarization-multiplexed m-ary Phase Shift Keyed (PMUX-mPSK) optical signald, where m may, e.g., 8, 64, 256 and so on. Such modulation formats include polarization or symbol interleaved QPSK or DQPSK modulated data signals. In light of the present disclosure, other embodiments may be readily appreciated by those skilled in the art.

Figure 3:
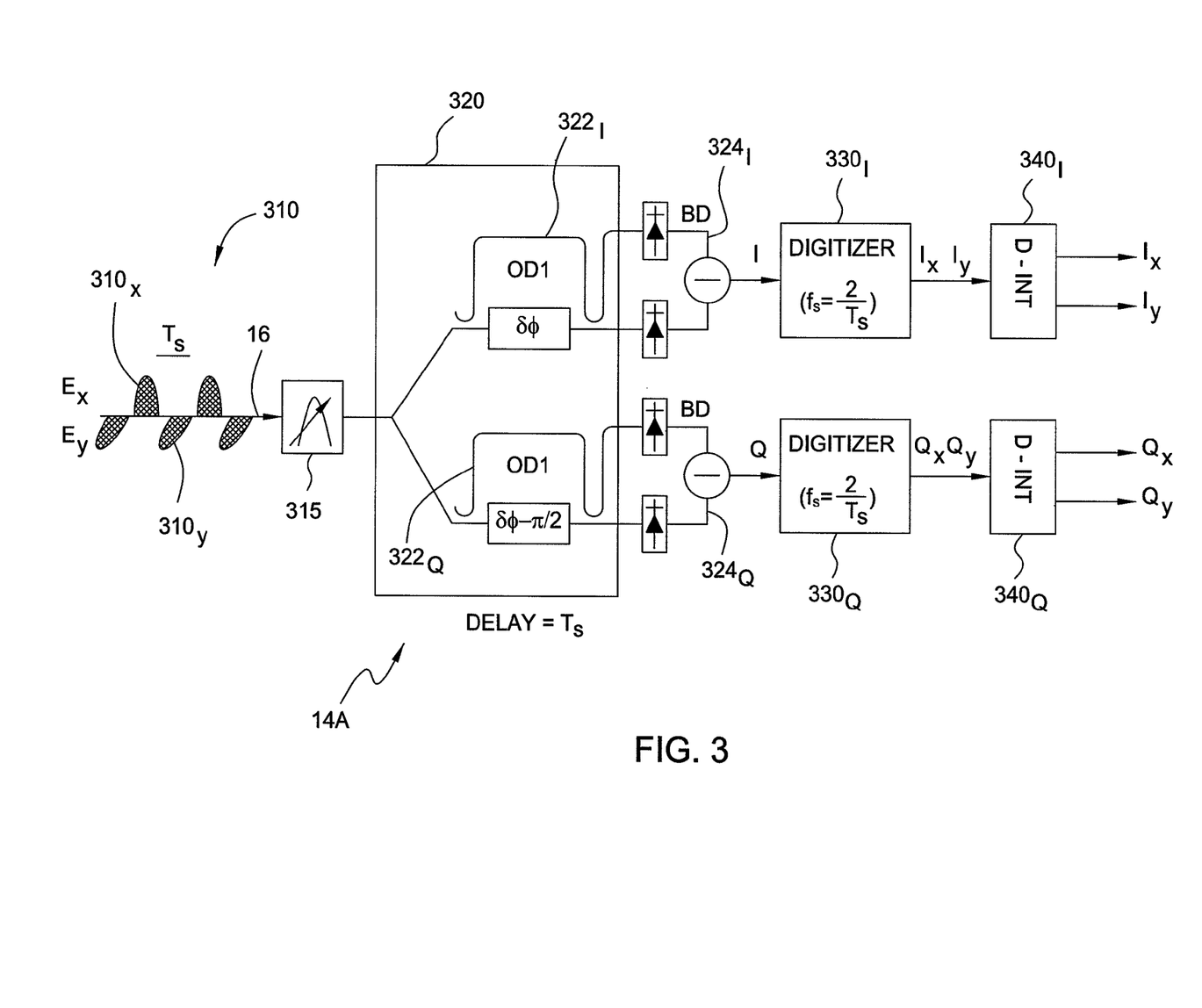
FIGS. 3-5 depict block diagrams of optical receivers/detectors suitable for use in the optical communications systems of FIGS. 1-2.
Figure 4:
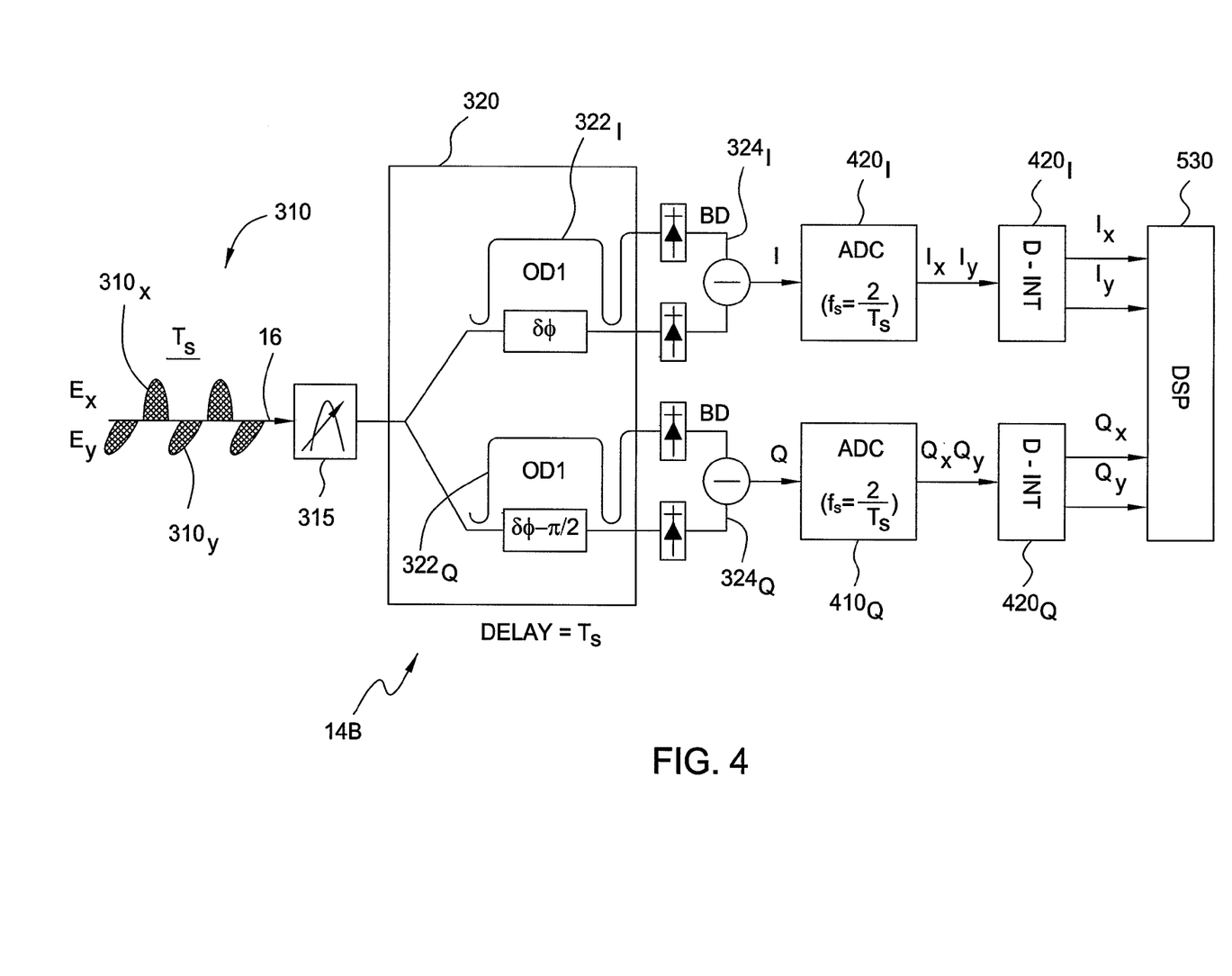

FIGS. 3-5 show block diagrams of optical receivers/detectors suitable for use in the optical communications systems of FIGS. 1-2. Specifically, referring to FIGS. 3-5, optical data receivers 14A, 14B, 14C receive an optical carrier signal 310 via an all-optical transmission line 16, e.g., as discussed above with respect to FIGS. 1-2.

FIG. 3 depicts an optical receiver or detector 300 suitable for implementing the optical receiver 14 of FIG. 1. The optical receiver or detector 300 receives, e.g., a polarization-multiplexed differential quadrature phase-shift keyed PMUX-DQPSK signal 310. Modulated upon PMUX-DQPSK signal 310, is pre-coded data from four original "in-phase" ("I") and "quadrature-phase" ("Q") data tributaries of two polarization components, Ix, Iy, Qx, and Qy. PMUX-DQPSK signal 310 comprises two polarization components, orthogonally oriented with respect to each other, including, for example, an 'x' polarized signal component Ex 310x, and a 'y' polarized signal component Ey 310y. Ex 310x, and Ey 310y both have an identical symbol period Ts. In one embodiment PMUX-DQPSK 310 signal utilizes a return-to-zero (RZ) format, and 310x, and Ey 310y are offset in time from each other by substantially half the symbol period Ts (i.e., Ts/2).

PMUX-DQPSK signal 310 is received by polarization independent orthogonal delay interferometer pair (ODIP) circuit 320. Internally, ODIP circuit 320i power divides the PMUX-DQPSK signal 310, and comprises two separate internal optical branches; namely, ODII 322I for receiving and recovering the 'I' components of PMUX-DQPSK signal 310, and ODIQ 322Q for receiving and recovering its 'Q' components. ODII 322I and ODIQ 322Q both have delay paths tuned to a delay value of substantially Ts, but differ in a relative phase offset of about substantially 90 degrees (about pi/2 radians). In this manner, the four outputs of ODI circuit 320 correspond to the constructive and destructive interferences of the 'I' and 'Q' components of PMUX-DQPSK signal 310.

The outputs of ODII 322I and ODIQ 322Q are fed respectively to the inputs of two balanced detectors 324I and 324Q, which generate corresponding electronic signals. In this embodiment, ODIP circuit 320 and balanced detectors 324I and 324Q collectively comprise a detection stage for detector 300. The outputs of balanced detectors 324I and 324Q are received respectively by a digitizing stage, comprising digitizers 330I and 330Q, i.e., analog-to-digital converters. Both digitizers 330I and 330Q operate at a sample rate (fs) of about twice the symbol rate, or about 2/Ts. Binary digitizer 330I thereby contemporaneously digitizes the 'I' portions of both polarization components Ex 310x and Ey 310y to produce a single binary output, while binary digitizer 330Q does the same for the 'Q' portions of both polarization components to produce a single binary output.

Following combined-polarization digitization, the two recovered 'I' and 'Q' binary outputs are passed respectively to two 1:2 electronic demultiplexers, or deinterleavers (D-INTs) 340I and 340Q, which represent a deinterleaving stage to separate the digital binary representation of the 'I' data symbols modulated on the 'x' polarized component of PMUX-DQPSK signal 310 (Ex 310x), from that modulated on the 'y' polarized component (Ey 310y), and in the same manner, to separate the digital binary representation of the 'Q' data symbols modulated on Ex 310x, from that modulated on Ey 310y.

FIG. 4 depicts an optical receiver or detector 400 suitable for implementing he receiver 14 of FIG. 1. The receiver 400 of FIG. 4 is similar to the receiver 300 of FIG. 3, except where noted herein. Specifically, binary digitizers 330I and 330Q are replaced by multilevel analog-to-digital converters (ADCs) 410I and 410Q, each having a sampling rate of two times the symbol rate, $4/T_s$, and providing a digital multilevel (instead of binary) output, e.g. with a resolution of about 5 bits (or 32 levels). The digital multilevel 'I' and 'Q' outputs are then passed respectively to D-INT $420_I$ and D-INT $420_Q$, which like D-INTs 420I and 420Q (of FIG. 3), respectively separate the digital multilevel representation of 'I' data symbols modulated on $E_x$ $310_x$ from that on $E_y$ $310_y$, and the digital multilevel representation of 'Q' data symbols contained on $E_x$ $310_x$, from that on $E_y$ $310_y$. But, D-INTs $420_I$ and $420_Q$ are additionally configured to support the multi-level resolution provided by ADCs 410I and 410Q.

The outputs of D-INTs 340I and 340Q, representing the digital multilevel representations of the data from the original four 'I' and 'Q' data tributaries of two polarization components, $I_x$, $I_y$, $Q_x$, and $Q_y$, are passed to a Digital Signal Processor (DSP) 430, configured to enhance the functionality of detector 400, receiver sensitivity and/or mitigate transmission impairments such as nonlinear phase noise, before recovering the original four data tributaries in the binary format. Receiver sensitivity enhancement, as an example, can be achieved through data-aided multi-symbol phase estimation. Nonlinear phase noise mitigation can be achieved through post nonlinear phase noise compensation.

FIG. 5 depicts an optical receiver or detector 500 suitable for implementing the receiver 14 of FIG. 2. The receiver 500 of FIG. 5 is similar to the receivers 300 of FIGS. 3 and 400 of FIG. 4, except where noted herein. Specifically, receiver or detector 500 detects PMUX-D8PSK signal 510, generated from six original data tributaries Ix, Iy, Qx, Qy, Tx, and Ty. PMUX-D8PSK signal 510 comprises two polarization components, orthogonally oriented with respect to each other, including, for example, an 'x' polarized signal component Ex 510x, and a 'y' polarized signal component Ey 510y. Ex 510x, and Ey 510y both have an identical symbol period Ts. ADCs 410I and 410Q. each has a sampling rate of two times the symbol rate, 4/Ts, and provides a digital multi-level output. The digital multilevel 'I' and 'Q' outputs are then passed respectively to D-INT 420I and D-INT 420Q, which respectively separate the digital multilevel representation of 'I' data symbols modulated on Ex 510x from that on Ey 510y, and the digital multilevel representation of 'Q' data symbols contained on Ex 510x, from that on Ey 510y.

The four outputs of D-INTs 420I and 420Q represent the digital multilevel representations of the data from four of the six original data tributaries of two polarization components, Ix, Iy, Qx, and Qy. The digital multilevel representations of the remaining two original data tributaries, Tx and Ty, are obtained through signal processing in DSP 530 using the available digital multilevel representations of Ix, Iy, Qx, and Qy. DSP 530 can optionally perform receiver sensitivity enhancement and/or mitigation of transmission impairments such as nonlinear phase noise. Finally, DSP 530 recovers the original six data tributaries of the PMUX-8DPSK signal in the binary format.

In other embodiments, an optical receiver or detector suitable for implementing the receiver 14 of FIG. 2 is provided using digital coherent detection assisted by an optical local oscillator (OLO). Specifically, the received signal is mixed with the OLO in a polarization-diversity hybrid that outputs the I and Q components of two orthogonal polarization states, which are later detected, sampled, and processed to recover the original data carried by the signal. The design of a typical digital coherent detection receiver is well known, e.g., as described by Ezra Ip et al, "Coherent detection in optical fiber systems," in Optics Express 16, 753-791 (2008), www.opticsinfobase.org/oe/abstract.cfm?URI=oe-16-2-753.

Various system design goals are realized by using different combinations of the optical transmitters of FIGS. 1-2 and the optical receivers of FIGS. 3-5.

One embodiment comprises a system using the optical transmitter 12A of FIG. 1 and the optical receiver 14A of FIG. 3, wherein a 100 Gb/s polarization interleaved return-to-zero DQPSK (PI-RZ DQPSK) signal is generated from four original data tributaries at 25-Gb/s each; namely, I1, I2, Q1, and Q2. The signal is detected by an orthogonal delay interferometer having a free spectral range (FSR) of about 25 GHz and four output ports that correspond to the constructive and estructive interferences of the "in-phase" (I) and "quadrature-phase" (Q) branches, and two balanced detectors (BDs) with a RF bandwidth of about 50 GHz. It is noted that PBS, polarization controller and optical local oscillator (LO) are not needed. Following the detection, the two RF signals can be digitized into a binary form by a decision flip flop (DFF), and de-interleaved by a 1:2 electronic deinterleaver (DEINT) to obtain the original four data tributaries; namely, I1, I2, Q1 and Q2.

Another embodiment comprises a system using the optical transmitter 12A of FIG. 1 and the optical receiver 14B of FIG. 4, wherein a 100 Gb/s PI-RZ DQPSK signal is generated as discussed above. This signal is the transmitted to an optical receiver and detected by on orthogonal delay interferometer having a free spectral range (FSR) of about 25 GHz (or a delay of about 40 ps) and two balanced detectors with a RF bandwidth of about 50 GHz. Following detection, the two RF signals can be digitized to a multilevel format (e.g., having a 4-bit resolution) using ADCs with two samples per symbol, and then de-interleaved by a 1:2 electronic DEINT to obtain multi-level representations of the original four data tributaries; namely, I1, I2, Q1 and Q2. These sampled signals may then be used for further digital signal processing (DSP), such as to enhance receiver sensitivity, and/or mitigate transmission impairments such as nonlinear phase noise.

Another embodiment comprises a system using the optical transmitter 12B of FIG. 2 and the optical receiver 14C of FIG. 5, wherein a 120-Gb/s polarization-interleaved (or polarization symbol interleaved) return-to-zero 8-ary DPSK (PI-RZ-8DPSK) signal is generated from six original data tributaries of 20-Gb/s each; namely, I1, I2, Q1, Q2, T1 and T2. The signal is detected by on orthogonal delay interferometer having a free spectral range (FSR) of about 20 GHz (or a delay of about 50 ps) and two balanced detectors with a RF bandwidth of about 40 GHz. Following the detection, the two RF signals can be digitized to a multilevel format (e.g., having a 4-bit resolution) with the help of ADCs and then de-interleaved by a 1:2 electronic DEINT to obtain multi-level representations of the four data tributaries; namely, I1, I2, Q1 and Q2. These sampled signals ore then used for further digital signal processing (DSP) to extract the other two data tributaries; namely, T1 and T2.

The embodiments of optical transmitters, optical receivers, systems and methods of operating systems of such elements to communicate data optically may be combined in various embodiments, including the few exemplary embodiments described above. The various embodiments can function using modulation schemes and/or at data rates other than those depicted herein with respect to the various figures.

The architecture described herein may support optical transport at a high bit rate per channel (e.g., 40 Gb/s or more or 100 Gb/s or more), at high spectral efficiency, and in a cost effective manner. Various transmission systems using the polarization-symbol-interleaving and differential direct detection also offer higher tolerance to fiber nonlinear effects and laser noise etc. than existing coherent-detection methods. The combination of polarization interleaving and multilevel DPSK provides high spectral efficiency and relaxes the bandwidth requirement for the needed optical modulators and their driver electronics. This described embodiments are compatible with the all-channel PMD mitigation method based on distributed fast polarization scrambling.

It will be appreciated by those skilled in the art, and informed by the teachings of the present invention, that the invention may be configured to provide and support any polarization multiplexed multilevel PSK or DPSK modulation formats, as well as additional polarization multiplexed modulation formats beyond those mentioned above. Hence, while the foregoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus, comprising:
an optical receiver for receiving a modulated optical carrier comprising a polarization-multiplexed (PMUX) return-to-zero (RZ) pulse stream having first and second polarization components bearing respective first and second phase-shift keying (PSK) modulated data streams, the optical receiver comprising:
a first polarization-independent optical delay interferometer (ODI) to provide an optical signal associated with in-phase data tributaries of each of said first and second PSK modulated data streams to a first balanced optical detector;

a first electrical decision circuit, coupled to said first balanced optical detector, for extracting said in-phase data tributaries of each of said first and second PSK modulated data streams;

a second polarization-independent ODI to provide an optical signal associated with quadrature-phase data tributaries of each of said first and second PSK modulated data streams to a second balanced optical detector; and a second electrical decision circuit, coupled to said second balanced optical detector, for extracting said quadrature-phase data tributaries of each of said first and second PSK modulated data streams.

2. The apparatus of claim 1, further comprising an optical transmitter configured to split a RZ pulse stream having a duty cycle not exceeding 50% into first and second orthogonal polarization components to provide respective first and second optical signals of orthogonal polarization, modulate respective data streams onto the first and second optical signals using phase-shift keying (PSK) modulation, and combine the modulated optical signals to provide said modulated optical carrier.

3. The apparatus of claim 1, wherein at least one of the first and second phase-shift keying (PSK) modulated data streams comprises a differential quadrature phase-shift keying (DQPSK) modulated data stream.

4. The apparatus of claim 1, wherein at least one of the first and second phase-shift keying (PSK) modulated data streams comprises a m-ary Phase Shift Keyed (mPSK) modulated data streams.

5. The apparatus of claim 1, wherein said first electrical decision circuit comprises:

an analog to digital (A/D) converter having a sample rate twice the orthogonal polarization component symbol rate for providing a bitstream including multiplexed in-phase data tributaries of each of said first and second PSK modulated data streams; and a de-interleaver, for demultiplexing said in-phase data tributaries of each of said first and second PSK modulated data streams.

6. The apparatus of claim 5, wherein said optical receiver further comprises a digital signal processor (DSP), coupled to said first and second de-interleavers to process demultiplexed in-phase and quadrature-phase data tributaries of each of said first and second PSK modulated data streams to recover respective first and second data streams therefrom.

7. The apparatus of claim 2, further comprising an all-optical transmission line connecting the optical transmitter to the optical receiver.

8. The apparatus of claim 2, wherein the optical transmitter further comprises a pulse carver configured to generate the stream of RZ pulses from a continuous wave optical carrier.

9. The apparatus of claim 8, wherein the pulse carver is configured to generate RZ pulses having a pulse period substantially matching a symbol period Ts of said first and second orthogonal polarization components.

10. The apparatus of claim 1, wherein the receiver further comprises:

a power divider responsive to said modulated optical carrier signal, for providing thereby first and second divided signals to, respectively, first and second ODIs.

11. The apparatus of claim 2, wherein the optical transmitter comprises:

a first modulator, for modulating first and second digital data streams onto a first orthogonal polarization component; and a second modulator, for modulating third and fourth digital data streams onto a second orthogonal polarization component.

12. The apparatus of claim 11, the optical transmitter further comprising:

a third modulator, for modulating digital data onto one or both of the first and second orthogonal polarization components according to a phase modulation format.

13. A method, comprising:

receiving a modulated optical carrier comprising a polarization-multiplexed (PMUX) return-to-zero (RZ) pulse stream having first and second polarization components bearing respective first and second phase-shift keying (PSK) modulated data streams;

processing said modulated optical carrier using a first polarization-independent optical delay interferometer (ODI) and a first balanced optical detector to provide a first detected output signal including in-phase data tributaries of each of said first and second PSK modulated data streams;

extracting from said first detected output signal said in-phase data tributaries of each of said first and second PSK modulated data streams;

processing said modulated optical carrier using a second polarization-independent optical delay interferometer (ODI) and a second balanced optical detector to provide a second detected output signal including quadrature-phase data tributaries of each of said first and second PSK modulated data streams; and extracting from said second detected output signal said quadrature-phase data tributaries of each of said first and second PSK modulated data streams.

14. The method of claim 13, further comprising splitting a RZ (return-to zero) pulse stream having a duty cycle not exceeding 50% into first and second orthogonal polarization components to provide respective first and second optical signals of orthogonal polarization;

modulating respective data streams onto the first and second optical signals using phase-shift keying (PSK) modulation; and combining the modulated optical signals to provide said modulated optical carrier.

15. A system, comprising:

an optical transmitter configured to split a RZ (return-to zero) pulse stream having a duty cycle not exceeding 50% into first and second orthogonal polarization components to provide respective first and second optical signals of orthogonal polarization, modulate respective data streams onto the first and second optical signals using phase-shift keying (PSK) modulation; and combining the modulated optical signals to provide a modulated optical carrier; and an optical receiver connected to receive the modulated optical carrier from the optical transmitter, extract in-phase data tributaries of each of said first and second PSK modulated data streams via first circuit elements comprising a first polarization-independent optical delay interferometer (ODI), a first balanced optical detector and a first electrical decision circuit, and extract quadrature-phase data tributaries of each of said first and second PSK modulated data streams via second circuit elements comprising a second polarization-independent ODI, a second balanced optical detector and a second electrical decision circuit.

* * * * *